J. RUDOLPHS.
DRY CELL.
APPLICATION FILED NOV. 15, 1911.
1,184,135.
Patented May 23, 1916.
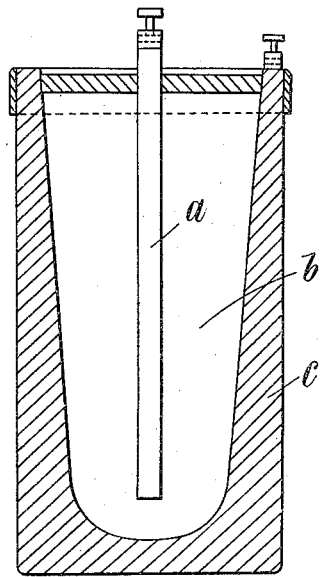

UNITED STATES PATENT OFFICE.

JOHN RUDOLPHS, OF HENRIKSDAL, SWEDEN.

DRY CELL.

1,184,135.          Specification of Letters Patent.      Patented May 23, 1916.

Application filed November 15, 1911. Serial No. 660,444.

*To all whom it may concern:*

Be it known that I, JOHN RUDOLPHS, a subject of the King of Sweden, residing at Henriksdal, Sweden, have invented new and useful Improvements in Dry Cells, of which the following is a specification.

The present invention relates to a dry battery cell with a porous carbon electrode exposed to the outer air.

The invention has for its object to arrange such cells in such a manner as to permit the escape of the gases formed at the positive electrode and contributing to a rapid decrease of the current, viz., to the polarization of the battery, but at the same time to prevent the escape of moisture from the pasty electrolyte of the battery and thus to prevent, as far as possible, its drying.

As well known, it is of importance for the activity of dry battery cells to maintain the electrolytic body of it in a moist condition. In the usual dry battery cells a continuous evaporation of the moisture of the said body takes place through the pores of the carbon electrode which is exposed to the outer air. For that reason, the pasty electrolyte soon becomes dry and the activity of the battery ceases. For avoiding this inconvenience, according to the present invention, the pores of the carbon electrode wholly or partly are filled with a hygroscopic liquid, for instance a solution of a hygroscopic salt. The pores of the carbon electrode are filled with hygroscopic liquid by soaking the electrode in said liquid. This hygroscopic liquid prevents the continuous evaporation through the pores of the carbon electrode of the moisture from the electrolyte, but permits the escape of the gases formed in the interior of the battery.

The invention may be applied to any known form of dry battery cell which is provided with a porous electrode exposed to the air. Such a dry cell is illustrated by way of example in the accompanying drawing, in which the figure is a sectional view therethrough.

In the cell shown in the drawing a zinc electrode $a$ is surrounded in the usual manner with a paste electrolyte $b$ contained in a porous electrode $c$ which is exposed to the air while the pores of the said electrode are filled with hygroscopic liquid, for example of calcium chlorid.

During the activity of the battery, gases, as well known, are formed in the interior of it. When these gases obtain a certain pressure they escape through the pores of the carbon electrode and carry away with them some evaporated moisture from the body of the electrolyte. These escaping gases cannot expel the hygroscopical liquid from the pores of the carbon electrode because the said liquid is retained in the pores by the capillary action of the carbon.

During the intervals of rest between the periods of activity of the element no gases are formed. During that time the hygroscopic liquid in the pores of the carbon electrode acts as a liquid seal and prevents the escape of moisture from the electrolyte. In this manner the period of life of the battery cell becomes much longer than that of the usual dry battery cells in which the moisture of the electrolyte can always freely escape through the bores of the carbon.

It being important that the sealing liquid in the pores of the carbon electrode should not evaporate, a hygroscopic liquid is used as sealing liquid. The losses arising in this liquid from its evaporation at the surface of the carbon electrode which is in contact with the outer air are compensated in the following manner. The gases formed in the battery cell, viz., hydrogen and ammonia first form a layer of gas on the surface of the carbon electrode facing the zinc electrode and then move by and by through the carbon electrode pores filled with hygroscopic liquid, which liquid thereby becomes saturated with the said gases. On account of the constant efflux of gas from the interior of the battery cell part of the gas and especially ammonia absorbed by the hygroscopic fluid during the activity of the battery cell escapes at the surface of the carbon electrode which is exposed to the outer air, and water is deposited on the carbon electrode, which is absorbed by the hygroscopic liquid. In this manner the quantity of liquid in the pores of the carbon electrode is kept practically uniform.

What I claim and desire to secure by Letters Patent of the United States is:—

A dry battery cell comprising a plurality of electrodes, one of said electrodes being porous, and pasty electrolyte, said porous electrode being in contact with the atmosphere and impregnated with a hygroscopic liquid whereby moisture is absorbed from the atmosphere therethrough to prevent the drying out of the electrolyte.

In testimony whereof I have signed my name to this specification in the presence of two subscribing witnesses.

JOHN RUDOLPHS.

Witnesses:
BIRGER NORDFELDT,
HILMA TELANDER.